United States Patent [19]

Amano et al.

[11] Patent Number: 4,910,273
[45] Date of Patent: Mar. 20, 1990

[54] METHOD FOR CHARGING STABILIZER FOR SUSPENSION POLYMERIZATION OF VINYL CHLORIDE

[75] Inventors: Tadashi Amano; Kouzou Kuwabara, both of Ibaragi; Junichi Watanabe, Ageo, all of Japan

[73] Assignee: Shin-Etsu Chemical Co., Ltd., Tokyo, Japan

[21] Appl. No.: 314,263

[22] Filed: Feb. 24, 1989

Related U.S. Application Data

[63] Continuation of Ser. No. 32,378, Mar. 31, 1987, abandoned.

[30] Foreign Application Priority Data

Apr. 3, 1986 [JP] Japan ................... 61-077079

[51] Int. Cl.$^4$ ............................................. C08F 2/20
[52] U.S. Cl. .................................. 526/202; 526/344.2
[58] Field of Search ........................................ 526/202

[56] References Cited

U.S. PATENT DOCUMENTS 4,324,878 4/1982 Biaggi ................... 526/200
4,345,056 8/1982 Thyret ................... 526/200

FOREIGN PATENT DOCUMENTS 5886 1/1977 Japan.
115890 9/1977 Japan.
6392 1/1978 Japan.
43792 4/1978 Japan.
136089 11/1978 Japan.
112210 8/1980 Japan.
15201 1/1987 Japan.
260803 11/1987 Japan.

Primary Examiner—Christopher Henderson
Attorney, Agent, or Firm—Oblon, Spivak, McClelland, Maier & Neustadt

[57] ABSTRACT

A method of charging a suspension stabilizer for suspension polymerization in an aqueous medium of a vinyl monomer comprising vinyl chloride, the suspension stabilizer comprising a partially saponified polyvinyl alcohol having an average polymerization degree of 200 to 600 and a saponification degree of 20 to 60 mole %, wherein the partially saponified polyvinyl alcohol is charged in the form of an aqueous suspension. The method makes it possible to charge a suspension stabilizer which is slightly soluble in water easily and efficiently without using organic solvents, thereby enhancing the quality of the vinyl chloride polymer obtained.

2 Claims, No Drawings

METHOD FOR CHARGING STABILIZER FOR SUSPENSION POLYMERIZATION OF VINYL CHLORIDE

This application is a continuation of application Ser. No. 07/032,378, filed on Mar. 31, 1987, now abandoned.

BACKGROUND OF THE INVENTION

1. Field of the Invention:

The present invention relates to a method of charging a suspension stabilizer for suspension polymerization, and more particularly, to a method of charging a suspension stabilizer for suspension polymerization in an aqueous medium of a vinyl monomer comprising vinyl chloride.

2. Description of the Related Art:

Use of a partially saponified polyvinyl alcohol as a suspension stabilizer in producing a vinyl chloride polymer by suspension polymerization in an aqueous medium has hitherto been known.

It has been found that, of partially saponified polyvinyl alcohols, one which has a low polymerization degree and a low saponification degree improves markedly the quality with respect to the monomer removability, plasticizer absorption property, processability and the like of the vinyl chloride polymer obtained, and it has ben proposed to use a partially saponified polyvinyl alcohol having a relatively low average polymerization degree and a relatively low saponification degree (see Japanese Unexamied Patent Publication (KOKAI) Nos. 5886/1977, 115890/1977, 43792/1978, 6392/1978, 136089/1978 and 112210/1980). For example, Japanese Unexamined Patent Publication (KOKAI) No. 43792/1978 describes the use of a partially saponified polyvinyl alcohol having a polymerization degree of 500 or less and a saponification degree of 60 mole % or less.

However, such a partially saponified polyvinyl alcohol having a low polymerization degree and a low saponification degree is slightly soluble in water, and, accordingly, the partially saponified polyvinyl alcohol is charged into the reaction system prior to polymerization either directly as a powder or in the form of solution in an organic solvent such as methanol and acetone.

In the method of charging the partially saponified polyvinyl alcohol as a powder, however, it is necessary for developing a quality-improving effect on the polymer sufficiently, to preliminarily mix thoroughly the powdery suspension stabilizer with water and the monomer prior to polymerization. This procedure, however, takes a long time, leading to longer production time and lower productivity. On the other hand, in the method of charging the partially saponified polyvinyl alcohol as a solution in an organic solvent, the solvent thus used will remain in the polymer product obtained, thereby adversely affecting the quality of the product, or will be contained in waste water discharged after the polymerization reaction, thereby a complicating step of treating the waste water being required.

SUMMARY OF THE INVENTION

Accordingly, an object of the present invention is to overcome the above-mentioned problems involved in the prior art and to provide a method which can efficiently charge a partially saponified polyvinyl alcohol having a low polymerization degree and a low saponification degree, as a suspension stabilizer, without using organic solvents.

The present invention provides a method of charging a suspension stabilizer for suspension polymerization in an aqueous medium of a vinyl monomer comprising vinyl chloride, the suspension stabilizer comprising a partially saponified polyvinyl alcohol having an average polymerization degree of 200 to 600 and a saponification degree of 20 to 60 mole %, wherein the partially saponified polyvinyl alcohol is charged in the form of an aqueous suspension.

According to the method of the present invention, the suspension stabilizer comprising the partially saponified polyvinyl alcohol having a low polymerization degree and a low saponification degree, which is useful for enhancing the properties of the vinyl chloride polymer obtained, particularly, plasticizer absorption property, monomer removability and processability, can be charged easily and efficiently, and the productivity in the production of the vinyl chloride polymer is improved. Namely, the aqueous suspension of the suspension stabilizer used in the method of the present invention can be prepared in a relatively short time and, because of its remarkable good stability, has good preservability, thereby contributing to improvement of productivity. In addition, since no organic solvents are used, the method of the invention has the advantage that the waste water produced contains no organic solvent.

DESCRIPTION OF THE PREFERRED EMBODIMENTS

The partially saponified polyvinyl alcohol for use in the method of the present invention has an average polymerization degree of 200 to 600, preferably 200 to 400, and a saponification degree of 20 to 60 mole %, preferably 30 to 55. If the average polymerization degree is more than 600 or the saponification degree is more than 60 mole %, the quality-improving effect on the vinyl chloride polymer will be low. On the other hand, if the average polymerization degree is less than 200 or the saponification degree is less than 20 mole %, the vinyl chloride polymer produced may have too small a bulk density or may have too large a particle size.

In the method of the present invention, the suspension stabilizer is charged in the form of an aqueous suspension into a polymerization vessel prior to the start of polymerization. The aqueous suspension is prepared by dispersing the suspension stabilizer in water.

The viscosity of the aqueous suspension of the suspension stabilizer is preferably 5 to 500 cP at 25° C., in view of high dispersion stability. In order to adjust the viscosity of the aqueous suspension to within tee above-mentioned range, for example, it is preferable to use as a stabilization aid a water-soluble partially saponified polyvinyl alcohol having an average polymerization degree of 650 to 2700 and a saponification degree of 65 to 99 mole %, a methyl cellulose having a degree of methoxy substitution of 27.5 to 31.5%, a hydroxypropylmethyl cellulose having a degree of methoxy substitution of 19 to 30% and a degree of hydroxypropoxy substitution of 4 to 12%, or the like.

In order to enhance the stability of the aqueous suspension so that the partially saponified polyvinyl alcohol as the suspension stabilizer does not precipitate, and in order to enhance the quality of the polymer obtained, it is preferable that the particle diameter of the above partially saponified polyvinyl alcohol used as the suspension stabilizer is not more than 150 μm, particularly, not more than 100 μm in the aqueous suspension. The particle diameter can be controlled to the above-mentioned value by, for example, adjusting the temperature of water which is used for preparation of the aqueous suspension to 50° C. to 90° C., when the partially saponified polyvinyl alcohol is disperse therein.

In preparing the aqueous suspension of the partially saponified polyvinyl alcohol used as the suspension stabilizer, the method of dispersing the partially saponified polyvinyl alcohol is not particularly limited. For example, the suspension stabilizer, a stabilization aid and water may be charged into a conventional vessel and agitated. There are no limitations as to the kind of the agitator or agitating blade. For example, a conventional agitator of the paddle, propeller, turbine, Brumagin or Pfaudler type may be used. In addition, a homogenizer or the like can be used together, as required.

The method of the present invention is applicable to any polymerization of a vinyl monomer comprising vinyl chloride by suspension polymerization in an aqueous medium. The monomer used here may be either vinyl chloride alone or a mixture of vinyl chloride and other vinyl monomer copolymerizable with vinyl chloride. In the latter case, a monomeric mixture comprising at least about 50% by weight of vinyl chloride is usually used. The other vinyl monomer copolymerizable with vinyl chloride may include, for example, vinyl esters such as vinyl acetate, vinyl propionate and the like; acrylates or methacrylates such as methyl acrylate, ethyl acrylate and the like; olefins such as ethylene, propylene and the like; acrylonitrile maleate anhydride; styrene; and vinylidene chloride.

In the suspension polymrization, use of other additives such as a dispersant and a polymerization initiator and polymerization conditions are not limited in any way. Namely, the polymerization can be carried out under conventional conditions using additives which are conventionally used.

Thus, the dispersants which can be used include, for example, water-soluble cellulose ethers such as methyl cellulose, hydroxyethyl cellulose, hyroxypropyl cellulose, hyroxypropylmethyl cellulose and the like; water-soluble polymers such as partially saponified polyvinyl alcohol, acrylic acid polymers gelatin and the like; oil-soluble emulsifiers such as sorbitan monolaurate, sobitan trioleate, glycerol tristearate, ethylene oxide-propylene oxide block copolymer and the like; polyoxyethylenesorbitan monolaurate and polyoxyethylene glycerol oleate; water-soluble emulsifiers such as sodium laurate, and the like. These dispersants may be added singly or in combination.

The polymerization initiators which can be used include, for example, percarbonate compounds such as di-isopropyl peroxycarbonate, di-2-ethylhexyl peroxydicarbonate, di-2-ethoxyethyl peroxycarbonate add the like; perester compounds such as t-butyl peroxyneodecanoate, α-cumyl peroxyneodecanoate, 2,4,4-trimethylpentyl peroxy-2-neodecanoate and the like; peroxides such as acetylcyclohexylsulfonyl peroxide, 2,4,4-trimethylpentyl-2-peroxyphenoxyacetate, potassium persulfate, ammonium persulfate, hydrogen peroxide and the like; azo compounds such as azobis-2,4-dimethylvaleronitrile, azobis(4-methoxy-2,4-dimethylvaleronitrile), etc. These polymerization initiators can be used singly or in combination.

Further, if required, known polymerization regulators, chain transfer agents, polymerization inhibitors, gelatin improving agents, antistatic agents, pH adjusters, etc. may be suitably added, as in the conventional suspension polymerizations of vinyl chloride.

In the suspension polymerization mentioned above, the amounts of the monomer, water and various additives including the suspension stabilizer charged according to the method of the present invention should be suitably determined according to the desired polymer, and should not be specifically limited by the present invention.

EXAMPLES

Example 1

(1) Preparation of an aqueous suspension of suspension stabilizer

A 1000-liter vessel equipped with an agitator was charged with 36 liter of deionized water, 2 kg of partially saponified polyvinyl alcohol (average polymerization degree: 240, saponification degree: 50.7 mole %) (which is hereinafter referred to as "partially saponified polyvinyl alcohol A") as a suspension stabilizer and 2 kg of partially saponified polyvinyl alcohol (average polymerization degree: 2550, saponification degree: 79.5 mole %) (which is hereinafter referred to as "partially saponified polyvinyl alcohol B") as a stabilization aid, and then agitation was started. While continuing agitation, the temperature of the mixture in the vessel was raised to 80° C., followed by cooling to obtain a uniform aqueous suspension. The viscosity of the thus obtained aqueous suspension at 55° C., the average particle diameter of partially saponified polyvinyl alcohol A dispersed in the aqueous suspension and the stability of the suspension when left to stand are shown in Table 1 below. This stability was evaluated according to the following criteria:

1: No precipitation is observed after the aqueous suspension is left to stand for 24 hours at room temperature.
2: No precipitation is observed after the aqueous suspension is left to stand for 6 hours at room temperature, but precipitation is observed after the suspension is left to stand for 24 hours.
3: Precipitation is observed after the aqueous suspension is left to stand for 2 hours at room temperature.

(2) Production of vinyl chloride polymer by suspension polymerization

A 2.1 m$^3$-stainless steel polymerization vessel was charged with 900 kg of deionized water, 2400 g of the aqueous suspension prepared in step (1) above, 360 g of partially saponified polyvinyl alcohol B and 252 g of di-2-ethylhexyl peroxydicarbonate, and after evacuating the vessel to 40 mmHg, 600 kg of vinyl chloride monomer was charged into he vessel. While agitating the content of the vessel, the temperature of the mixture in the vessel was raised to and maintained at 62° C., and polymerization was carried out at this temperature. When the pressure inside the vessel reached 7.0 kg/cm$^2$·G, the reaction was stopped, and unreacted monomer was recovered. After drying the thus obtained polymer at 70° C., the bulk specific gravity, particle size distribution and the amount of dioctyl phthalate (DOP) which can be absorbed by the polymer and the amount of the residual vinyl chloride monomer contained in the polymer were measured. The particle size distribution of the polymer particles was determined by passing the particles through 60, 80, 100, 120, 150 and 200 mesh (JIS) sieves in this order and measuring the proportion (in wt.%) of the particles that passed through each sieve based on the total amount of the particles. Further, the COD in the waste water discharged after completion of the polymerizatinn was measured. The results are shown in Table 1.

Example 2

Preparation of an aqueous suspension and production of a polymer were carried out in the same manner as in Example 1 except for using a partially saponified polyvinyl alcohol having an average polymerization degree of 830 and a saponification degree of 73.3 mole %, in place of the partially saponified polyvinyl alcohol B.

Example 3

Preparation of an aqueous suspension and production of a polymer were carried out in the same manner as in Example 1 except that the temperature of the mixture agitated when preparing the aqueous suspension was changed to 30° C.

Example 4

Preparation of an aqueous suspension and production of a polymer were carried out in the same manner as in Example 1 except that the temperature of the mixture agitated when preparing an aqueous suspension was changed 60° C.

Example 5

(1) Preparation of aqueous suspension of suspension stabilizer

A 100-liter stainless steel vessel equipped with an agitator was charged with 38 liter of deionized water, 1 kg of partially saponified polyvinyl alcohol A as a suspension stabilizer and 1 kg of hydroxypropylmethyl cellulose (degree of methoxy substitution: 29%, degree of hydroxypropoxy substitution: 10%) as a stabilization aid, and then agitation was started. While continuing agitation, the temperature of the mixture in the vessel was raised to 80° C., followed by cooling to obtain a uniform aqueous suspension.

(2) Production of vinyl chloride polymer by suspension polymerization

A 2.1 m$^3$-stainless steel polymerization vessel was charged with 900 kg of deionized water, 4800 g of the aqueous suspension prepared in step (1) above, 240 g of partially saponified polyvinyl alcohol B and 252 g of di-2-ethylhexyl peroxydicarbonate, and after evacuating the vessel to 40 mmHg, 600 kg of a vinyl chloride monomer was charged into the vessel. While agitating the mixture in the vessel, the temperature of the mixture in the vessel was raised to and maintained at 62° C., and polymerization was carried out at this temperature. When the pressure inside the vessel reached 7.0 kg/cm$^2$.G, the reaction was stopped, and unreacted monomer was recovered. After drying the thus obtained polymer at 70° C., the bulk specific gravity, particle size distribution and the amount of DOP which can be absorbed in the polymer and the amount of the residual vinyl chloride monomer contained in the polymer were measured.

Comparative Example 1

A vinyl chloride polymer was produced in the same manner as in step (2) of Example 1 except that the partially saponified polyvinyl alcohol A in the amount of 120 g was charge as a powder and the amount of partially saponified polyvinyl alcohol B used was changed to 480 g.

Comparative Example 2

A vinyl chloride polymer was produced in the same manner as in step (2) of Example 1 except that the partially saponified polyvinyl alcohol A was charged in the form of a solution dessolved in 120 g of methanol and the amount of the partially saponified polyvinyl alcohol B used was changed to 480 g.

The aqueous suspensions prepared in Examples 2 to 5 and the vinyl chloride polymers obtained in Examples 2 to 5 and the Comparative Example 1 and 2 were subjected to the same measurements and evaluation as those in Example 1. The results are shown in Table 1.

TABLE 1

|  | Example 1 | Example 2 | Example 3 | Example 4 | Example 5 | Comparative Example 1 | Comparative Example 2 |
|---|---|---|---|---|---|---|---|
| Aqueous suspension | | | | | | | |
| Viscosity (cP, 25° C.) | 180 | 60 | 130 | 140 | 200 | — | — |
| Average particle diameter (μm) | 30 | 50 | 100 | 80 | 20 | — | — |
| Stability | 1 | 1 | 2 | 1 | 1 | — | — |
| Properties of polymer | | | | | | | |
| Bulk density | 0.560 | 0.555 | 0.560 | 0.562 | 0.568 | 0.571 | 0.552 |
| Particle size distribution (mesh, undersize fraction, %) | | | | | | | |
| 60 | 100 | 100 | 100 | 99.9 | 100 | 98.2 | 100 |
| 80 | 99.5 | 99.6 | 92.0 | 89.9 | 99.8 | 32.6 | 99.3 |
| 100 | 81.5 | 72.0 | 71.1 | 70.6 | 83.1 | 20.9 | 81.0 |
| 120 | 38.2 | 25.3 | 31.0 | 30.2 | 40.2 | 10.8 | 38.0 |
| 150 | 11.6 | 8.1 | 8.9 | 8.6 | 14.7 | 3.2 | 11.0 |
| 200 | 2.1 | 0.7 | 1.1 | 0.9 | 3.5 | 0.3 | 1.9 |
| Amount of DOP absorbed | 20.2 | 20.9 | 19.5 | 19.1 | 21.1 | 17.2 | 19.6 |
| Amount of residual monomer (ppm) | 0.8 | 0.5 | 1.5 | 2.9 | 0.5 | 8.2 | 2.4 |
| COD in polymerization waste water (mg/l) | 22 | 20 | 23 | 25 | 24 | 23 | 100 |

We claim:

1. A method of charging a suspension stabilizer for suspension polymerization in an aqueous medium of a vinyl monomer comprising vinyl chloride, said suspension stabilizer comprising a partially saponified polyvinyl alcohol having an average polymerization degree of 200 to 600, a saponification degree of 20 to 60 mole %, and a particle diameter of not more than 50 μm, which has been prepared by dispersing said partially saponified polyvinyl alcohol in water at a temperature of 50° to 90° C., wherein said partially saponified polyvinyl alcohol is charged in the form of an aqueous suspension without organic solvents.

2. A method according to claim 1, wherein said aqueous suspension has a viscosity of 5 to 500 cP at 25° C.